United States Patent
Zhou

(10) Patent No.: US 11,934,765 B2
(45) Date of Patent: Mar. 19, 2024

(54) DOCUMENT ELEMENT ALIGNMENT METHOD AND APPARATUS, ELECTRONIC DEVICE, AND STORAGE MEDIUM

(71) Applicants: BEIJING KINGSOFT OFFICE SOFTWARE, INC., Beijing (CN); ZHUHAI KINGSOFT OFFICE SOFTWARE CO., LTD, Guangdong (CN)

(72) Inventor: Zean Zhou, Guangdong (CN)

(73) Assignees: BEIJING KINGSOFT OFFICE SOFTWARE, INC.; ZHUHAI KINGSOFT OFFICE SOFTWARE CO., LTD

( * ) Notice: Subject to any disclaimer, the term of this patent is extended or adjusted under 35 U.S.C. 154(b) by 0 days.

(21) Appl. No.: 17/619,167

(22) PCT Filed: Jul. 24, 2020

(86) PCT No.: PCT/CN2020/104090
§ 371 (c)(1),
(2) Date: Dec. 14, 2021

(87) PCT Pub. No.: WO2021/013241
PCT Pub. Date: Jan. 28, 2021

(65) Prior Publication Data
US 2022/0358279 A1    Nov. 10, 2022

(30) Foreign Application Priority Data

Jul. 25, 2019 (CN) .......................... 201910676796.5

(51) Int. Cl.
*G06F 40/103* (2020.01)
*G06F 40/131* (2020.01)

(52) U.S. Cl.
CPC .......... *G06F 40/103* (2020.01); *G06F 40/131* (2020.01)

(58) Field of Classification Search
CPC ........................... G06F 40/103; G06F 40/131
See application file for complete search history.

(56) References Cited

U.S. PATENT DOCUMENTS 7,295,708 B2 * 11/2007 Chen ..................... G06F 40/171
  382/181
8,407,589 B2 * 3/2013 Ye ......................... G06F 18/231
  715/263

(Continued)

FOREIGN PATENT DOCUMENTS

CN    104881298 A    9/2015
CN    105393246 A    3/2016

(Continued)

OTHER PUBLICATIONS

Vasileiadis et al., "Extraction of Tabular Data from Document Images", Proceedings of the Fifth International Symposium of Chinese CHI, ACMPUB27, New York, NY, USA, Apr. 2, 2017, 3 pages.

(Continued)

*Primary Examiner* — Benjamin Smith
(74) *Attorney, Agent, or Firm* — Zhong Law, LLC

(57) ABSTRACT

Embodiments of the present application relate to the technical field of computer information and provide a method and an apparatus for aligning elements in a document, an electronic device and a storage medium. The method includes: obtaining elements contained in a document; assigning the obtained elements into groups; obtaining an inter-group alignment manner between the groups, and obtaining an intra-group alignment manner for elements in each of the groups; and aligning all the groups based on the inter-group alignment manner, and aligning elements in each of the groups based on the intra-group alignment manner. By (Continued)

means of the solution for aligning elements in a document provided by the embodiments of the present application, the efficiency for aligning the elements in the document can be improved.

14 Claims, 7 Drawing Sheets

(56) References Cited

U.S. PATENT DOCUMENTS

| | | | | |
|---|---|---|---|---|
| 8,443,278 | B2* | 5/2013 | Mansfield | G06V 30/414 |
| | | | | 715/227 |
| 8,572,024 | B2 | 10/2013 | Ashkenazi et al. | |
| 8,983,965 | B2* | 3/2015 | Yamamoto | G06F 16/30 |
| | | | | 707/741 |
| 9,135,249 | B2* | 9/2015 | Dejean | G06F 40/258 |
| 9,384,172 | B2* | 7/2016 | Lukic | G06F 40/205 |
| 9,842,251 | B2* | 12/2017 | Grams | G06F 40/171 |
| 10,310,710 | B2* | 6/2019 | Grams | G06F 40/137 |
| 10,387,034 | B2* | 8/2019 | Lee | G06V 30/32 |
| 10,394,935 | B2 | 8/2019 | Xue | |
| 10,460,162 | B2* | 10/2019 | Gelosi | G06F 40/131 |
| 10,579,707 | B2* | 3/2020 | Prebble | G06V 30/412 |
| 10,649,647 | B2* | 5/2020 | Lee | G06F 3/04842 |
| 10,726,198 | B2* | 7/2020 | Gelosi | G06F 40/166 |
| 11,086,515 | B2* | 8/2021 | Lee | G06F 3/04886 |
| 11,256,856 | B2* | 2/2022 | Gelosi | G06F 40/131 |
| 2005/0063591 | A1* | 3/2005 | Chen | G06V 30/1423 |
| | | | | 382/181 |
| 2008/0260241 | A1* | 10/2008 | Ye | G06F 40/171 |
| | | | | 382/159 |
| 2010/0174975 | A1* | 7/2010 | Mansfield | G06F 40/186 |
| | | | | 707/E17.058 |
| 2010/0257177 | A1* | 10/2010 | Yamamoto | G06F 16/30 |
| | | | | 707/741 |
| 2014/0095992 | A1* | 4/2014 | Ye | G06F 40/171 |
| | | | | 715/268 |
| 2015/0095022 | A1* | 4/2015 | Xu | G06V 30/416 |
| | | | | 704/10 |
| 2015/0149893 | A1* | 5/2015 | Lukic | G06F 40/103 |
| | | | | 715/249 |
| 2015/0242373 | A1 | 8/2015 | Xue | |
| 2016/0147434 | A1* | 5/2016 | Lee | G06F 40/171 |
| | | | | 715/838 |
| 2016/0189404 | A1* | 6/2016 | Edge | G06F 40/166 |
| | | | | 715/202 |
| 2017/0068445 | A1* | 3/2017 | Lee | G06F 40/171 |
| 2017/0220859 | A1* | 8/2017 | Grams | G06F 40/174 |
| 2018/0088747 | A1* | 3/2018 | Grams | G06F 40/137 |
| 2019/0114479 | A1* | 4/2019 | Gelosi | G06F 40/166 |
| 2019/0205362 | A1* | 7/2019 | Prebble | G06F 40/103 |
| 2019/0220503 | A1* | 7/2019 | Gelosi | G06F 40/177 |
| 2019/0339861 | A1* | 11/2019 | Lee | G06V 30/1423 |
| 2021/0150128 | A1* | 5/2021 | Gelosi | G06F 40/177 |
| 2021/0390298 | A1* | 12/2021 | Pito | G06F 40/242 |
| 2023/0056987 | A1* | 2/2023 | Hunter | G06F 16/367 |

FOREIGN PATENT DOCUMENTS

| | | | | |
|---|---|---|---|---|
| CN | 109815446 | A | | 5/2019 |
| CN | 112528813 | A * | 3/2021 | ......... G06K 9/00456 |
| EP | 1655670 | A2 | | 5/2006 |
| JP | 2014086006 | A | | 5/2014 |

OTHER PUBLICATIONS

Extended European Search Report received in European Application No. 20843058.7 dated Jun. 8, 2022, pp. 1-8.
ISA State Intellectual Property Office of the People's Republic of China, International Search Report Issued in Application No. PCT/CN2020/104090, dated Oct. 28, 2020, WIPO, 4 pages.
ISA State Intellectual Property Office of the People's Republic of China, Written Opinion of the International Searching Authority Issued in Application No. PCT/CN2020/104090, dated Oct. 28, 2020, WIPO, 5 pages.(Submitted with Machine/Partial Translation).
JPO, Japanese Office Action received in Japanese Application No. 2021-574267 dated Mar. 8, 2023, pp. 1-8.

* cited by examiner

DOCUMENT ELEMENT ALIGNMENT METHOD AND APPARATUS, ELECTRONIC DEVICE, AND STORAGE MEDIUM

CROSS REFERENCE TO RELATED APPLICATIONS

The present application is the U.S. national stage of PCT/CN2020/104090 filed on Jul. 4, 2020, which claims the priority to a Chinese Patent Application No. 201910676796.5, filed with the China National Intellectual Property Administration on Jul. 25, 2019 and entitled "METHOD AND APPARATUS FOR ALIGNING ELEMENTS IN DOCUMENT". The contents of the above-mentioned applications are incorporated herein by reference in their entireties.

TECHNICAL FIELD

The present application relates to the technical field of computer information, and in particular, to a method, apparatus, electronic device, and storage medium for aligning elements in a document.

BACKGROUND

To improve the display effect of information when a user uses a presentation document to display the information, elements in the presentation document may need to be aligned based on a layout structure in the production and design of the presentation document.

In current technologies, when aligning each of the elements in the presentation document, the user usually manually configures an alignment arrangement for each of the elements in the document one by one.

It can be seen that the efficiency of current technologies to align the elements in the document is low. The efficiency is even lower in a case where there are a large number of elements in the document.

SUMMARY

Embodiments of the present application are to provide a method, apparatus, electronic device, and storage medium for aligning elements in a document, thereby improving the efficiency of aligning elements in the document. The implemented technical solutions are as follows.

In a first aspect, an embodiment of the present application provides a method for aligning elements in a document. The method includes:
  obtaining elements contained in the document;
  assigning the elements into groups;
  obtaining an inter-group alignment manner between the groups, and obtaining a respective intra-group alignment manner for elements in each of the groups; and
  aligning the groups based on the inter-group alignment manner, and aligning the elements in each of the groups based on the corresponding intra-group alignment manner.

In an embodiment of the present application, assigning the elements into groups includes:
  determining regions, in which the elements are located, in the document;
  determining regions overlapping each other in the determined regions as one region group;
  for each region group, determining a minimum region containing all regions in the region group; and
  determining a plurality of region groups whose minimum regions are the same, and assigning elements corresponding to regions in each of the plurality of region groups into one group.

In an embodiment of the present application, assigning the elements into groups includes:
  determining position regions, in which the elements are located, in the document;
  determining position regions overlapping each other in the determined position regions as one position region group;
  for each position region group, determining a minimum position region containing all position regions in the position region group;
  determining a plurality of position region groups whose minimum position regions have a same contour; and
  assigning elements corresponding to position regions in each of the plurality of position region groups into one group.

In an embodiment of the present application, after determining the plurality of position region groups whose minimum position regions have the same contour, the method further includes:
  determining whether a number of position regions in each of the plurality of position region groups is the same,
  if the number of position regions in each of the plurality of position region groups is the same, assigning the elements corresponding to the position regions in each of the plurality of position region groups into one group.

In an embodiment of the present application, assigning the elements into groups includes:
  projecting the elements in a preset direction to obtain projection regions;
  determining projection regions overlapping each other in the obtained projection regions to obtain projection region groups;
  for each projection region group, determining a minimum projection region containing all projection regions in the projection region group;
  determining a plurality of projection region groups whose minimum projection regions are the same, and assigning elements corresponding to projection regions in each of the plurality of projection region groups into one group.

In an embodiment of the present application, after determining the plurality of projection region groups whose minimum projection regions are the same, the method further includes:
  determining whether a number of projection regions in each of the plurality of projection region groups is the same;
  in response to determining that the number of projection regions in each of the plurality of projection region groups is the same, assigning the elements corresponding to the projection regions in each of the plurality of projection region groups into one group.

In an embodiment of the present application, assigning the elements into groups includes:
  determining an attribute of each of the elements;
  obtaining distribution of the attributes of the elements based on distribution of the elements in the document, and determining a distribution rule for the attributes of the elements in the document based on the distribution of the attributes of the elements; and
  assigning the elements based on the distribution rule.

In a second aspect, an embodiment of the present application provides an apparatus for aligning elements in a document. The apparatus includes:

an element obtaining module configured for obtaining elements contained in the document;

an element assigning module configured for assigning the elements into groups;

an alignment manner obtaining module configured for obtaining an inter-group alignment manner between the groups, and obtaining a respective intra-group alignment manner for elements in each of the groups; and an element aligning module configured for aligning the groups based on the obtained inter-group alignment manner, and aligning the elements in each of the groups based on the obtained corresponding intra-group alignment manner.

In an embodiment of the present application, the element assigning module includes:

a region determining unit configured for determining regions, in which the elements are located, in the document;

a region group determining unit configured for determining regions overlapping each other in the determined regions as one region group;

a minimum region determining unit configured for, for each region group, determining a minimum region containing all regions in the region group; and an element assigning unit configured for determining a plurality of region groups whose minimum regions are the same, and assigning elements corresponding to regions in each of the plurality of region groups into one group.

In an embodiment of the present application, the element assigning module includes:

a position region determining unit configured for determining position regions, in which the elements are located, in the document;

a position region group determining unit configured for determining position regions overlapping each other in the determined position regions as one position region group;

a minimum position region determining unit configured for, for each position region group, determining a minimum position region containing all position regions in the position region group;

a position region group identifying unit configured for determining a plurality of position region groups whose minimum position regions have a same contour; and a first element assigning unit configured for assigning elements corresponding to position regions in each of the plurality of position region groups into one group.

In an embodiment of the present application, the element assigning module further includes:

a position region number determining unit configured for, after the position region group identifying unit determines the plurality of position region groups whose minimum position regions have the same contour, determining whether a number of position regions in each of the plurality of position region groups is the same; and in response to determining that the number of position regions in each of the plurality of position region groups is the same, triggering the first element assigning unit.

In an embodiment of the present application, the element assigning module includes:

an element projection unit configured for projecting the elements in a preset direction to obtain projection regions;

a projection region group obtaining unit configured for determining projection regions overlapping each other in the obtained projection regions to obtain projection region groups;

a minimum projection region determining unit configured for, for each projection region group, determining a minimum projection region containing all projection regions in the projection region group;

a projection region group identifying unit configured for determining a plurality of projection region groups whose minimum projection regions are the same; and a second element assigning unit configured for assigning elements corresponding to projection regions in each of the plurality of projection region groups into one group.

In an embodiment of the present application, the element assigning module further includes:

a projection region number determining unit configured for, after the projection region group identifying unit determines the plurality of projection region groups whose minimum projection regions are the same, determining whether a number of projection regions in each of the plurality of projection region groups is the same, and in response to determining that the number of projection regions in each of the plurality of projection region groups is the same, triggering the second element assigning unit.

In an embodiment of the present application, the element assigning module is further configured for:

determining an attribute of each of the elements;

obtaining distribution of the attributes of the elements based on distribution of the elements in the document, and determining a distribution rule for the attributes of the elements in the document based on the distribution of the attributes of the elements; and assigning the elements based on the distribution rule.

In a third aspect, an embodiment of the present application provides an electronic device, including: a processor, a communication interface, a memory, and a communication bus, wherein, the processor, the communication interface and the memory communicate with each other through the communication bus, the memory is configured for storing a computer program;

the processor is configured for executing the computer program stored in the memory to implement any method for aligning elements in a document in the first aspect.

In a fourth aspect, an embodiment of the present application provides a computer-readable storage medium having stored therein a computer program; wherein, the computer program is executed by a processor, so as to cause the processor to implement any method for aligning elements in a document in the first aspect.

In a fifth aspect, an embodiment of the present application provides a computer program product including instructions; wherein, the computer program product, when executed by a computer, causes the computer to perform any method for aligning elements in a document as described above.

The beneficial effects of the embodiments of the present application are as follows:

The embodiments of the present application provide a solution for aligning elements in a document. Elements contained in a document are first obtained; the elements are grouped; an inter-group alignment manner between all groups is obtained, and a respective intra-group alignment manner for elements in each of the groups is obtained; the groups are aligned based on the inter-group alignment manner, and the elements in each of the groups are aligned based on the corresponding intra-group alignment manner. Compared with the prior art, the solution for aligning the elements in a document provided by the embodiment of the present application groups the elements based on relationships between elements in the document and achieves a batch alignment of the elements in the document based on the existing intra-group alignment manner and inter-group alignment manner, without repeating, by the user, a manual alignment operation several times to align the elements in the document.

Thus, by means of the solution for aligning elements in a document provided by the embodiments of the present application, the efficiency for aligning the elements in a document can be improved.

BRIEF DESCRIPTION OF THE DRAWINGS

To describe more clearly the technical solutions of the embodiments of the present application or of the current technologies, drawings used in embodiments and the current technologies will be briefly described below. Clearly, the drawings described below are for only some embodiments of the present application; those skilled in the art can also obtain other drawings based on these drawings without any creative efforts.

DETAILED DESCRIPTION OF THE EMBODIMENTS

To make the objectives, technical solutions, and advantages of the present application clearer and more understandable, the present application will be described in more detail below with reference to the appended drawings and embodiments. Clearly, the described embodiments are only some, and not all, of the embodiments of the present application. All other embodiments obtained based on the embodiments of the present application by those skilled in the art without any creative efforts fall into the scope of protection of the present application.

An embodiment of the present application provides a method and an apparatus for aligning elements in a document, which can implement highly efficient alignment of elements in a document.

A method for aligning elements in a document according to the embodiment of the present application is first introduced in the following.

Figure 1:
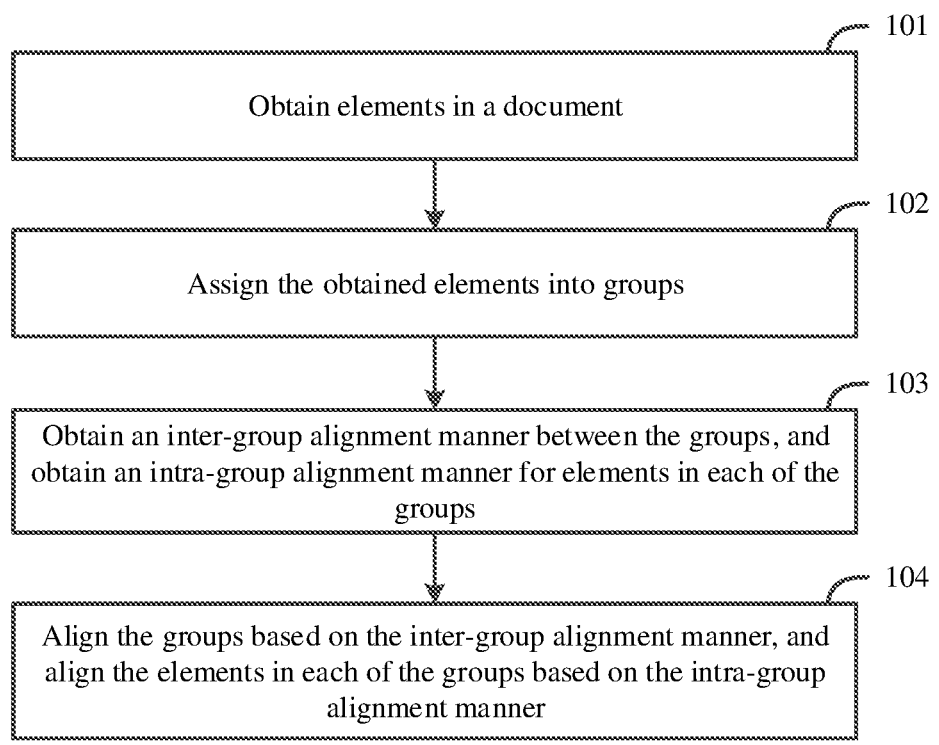
FIG. 1 is a flowchart of a first method for aligning elements in a document according to an embodiment of the present application.

As shown in FIG. 1, an embodiment of the present application provides a first method for aligning elements in a document, which is applied to an electronic device. The electronic device may be a device with a document processing function, such as a computer and a cell phone. The method may include steps 101-104.

At step 101, obtaining elements in a document are obtained.

The elements contained in the document may be pictures, texts, figures and the like. The document may be a text document, a presentation document or the like.

In an embodiment of the present application, the electronic device may obtain all the elements in the document or obtain elements in a preset region. For example, for a presentation document, the electronic device may obtain elements in a single page, which is not limited in the embodiments of the present application.

In an embodiment of the present application, an electronic device may further obtain elements selected by a user.

At step 102, assigning the elements into groups.

In an embodiment of the present application, the electronic device may assign the elements based on position regions in which the elements located, or may assign the elements based on projection regions of the elements, or may assign the elements based on attributes of the elements.

At step 103, obtain an inter-group alignment manner between the groups, and an intra-group alignment manner for elements within each of the groups is obtained.

The alignment manners may be left alignment, top alignment, center alignment, distributed alignment or the like.

As to the inter-group alignment manner, in an embodiment of the present application, the electronic device may obtain a preset inter-group alignment manner, or obtain an inter-group alignment manner selected by a user, or obtain, on the basis of a group, an alignment manner for a group, which is used as the inter-group alignment manner.

Regarding the intra-group alignment manner, in an embodiment of the present application, the electronic device may obtain a preset intra-group alignment manner, or obtain an intra-group alignment manner selected by a user, or obtain, on the basis of a group, an intra-group alignment manner for the group, which is used as the intra-group alignment manner for other groups. For a group, the electronic device may obtain an alignment manner for an element in the group as the intra-group alignment manner for the group.

At step 104, the groups are aligned based on the obtained inter-group alignment manner, and the elements in each of the groups are aligned based on the obtained corresponding intra-group alignment manner.

Thus, in the solution for aligning elements in a document provided by the embodiment, elements contained in a document are obtained; the elements are grouped; an inter-group alignment manner between all groups is obtained, and an intra-group alignment manner for elements in each of the groups is obtained; the groups are aligned based on the inter-group alignment manner, and the elements in each of the groups are aligned based on the intra-group alignment manner. Compared with the current technologies, the solution for aligning the elements in a document provided by the embodiment of the present application groups the elements based on relationships between elements in the document and performs a batch alignment of the elements in the document based on the existing intra-group alignment manner and inter-group alignment manner, without repeating, by the user, manual alignment operations several times to align the elements in the document. By applying the solution for aligning elements in a document provided by the embodiment, the efficiency of aligning the elements in the document can be improved.

The assigning of elements into groups is described below through specific embodiments.

In an embodiment, assigning the elements into groups specifically includes the following steps:

At step 1, regions in which the elements are located are determined in the document;

At step 2, in the determined regions, regions which overlap each other are determined as one region group;

At step 3, for each region group, a minimum region containing all regions in the region group is determined; and At step 4, a plurality of region groups whose minimum regions are the same are determined, and assigning elements corresponding to regions in each of the plurality of region groups into one group.

Optionally, after the plurality of region groups whose minimum regions are the same are determined, the method further includes:

determining whether a number of regions in each of the plurality of region groups is the same; in response to determining that the number of regions in each of the plurality of region groups is the same, performing the step of assigning elements corresponding to regions in each of the plurality of region groups into one group.

In the steps 1 to 4, the regions in which the elements are located in the document may be position regions actually occupied by the elements in the document. Accordingly, the plurality of region groups whose minimum regions are the same in the step 4 are a plurality of position region groups whose minimum position regions have the same contour.

Alternatively, the regions in which the elements are located in the document may be projection regions obtained by projecting the elements in a preset direction. Accordingly, the plurality of region groups whose minimum regions are the same in the step 4 are a plurality of projection region groups having the same minimum projection region.

If the regions are the position regions actually occupied by the elements in the document, the steps 1 to 4 may be implemented as a method described in the following first embodiment.

If the regions are the projection regions obtained by projecting the elements in a preset direction, the steps 1 to 4 may be implemented as a method described in the following second embodiment.

First Embodiment

Figure 2:
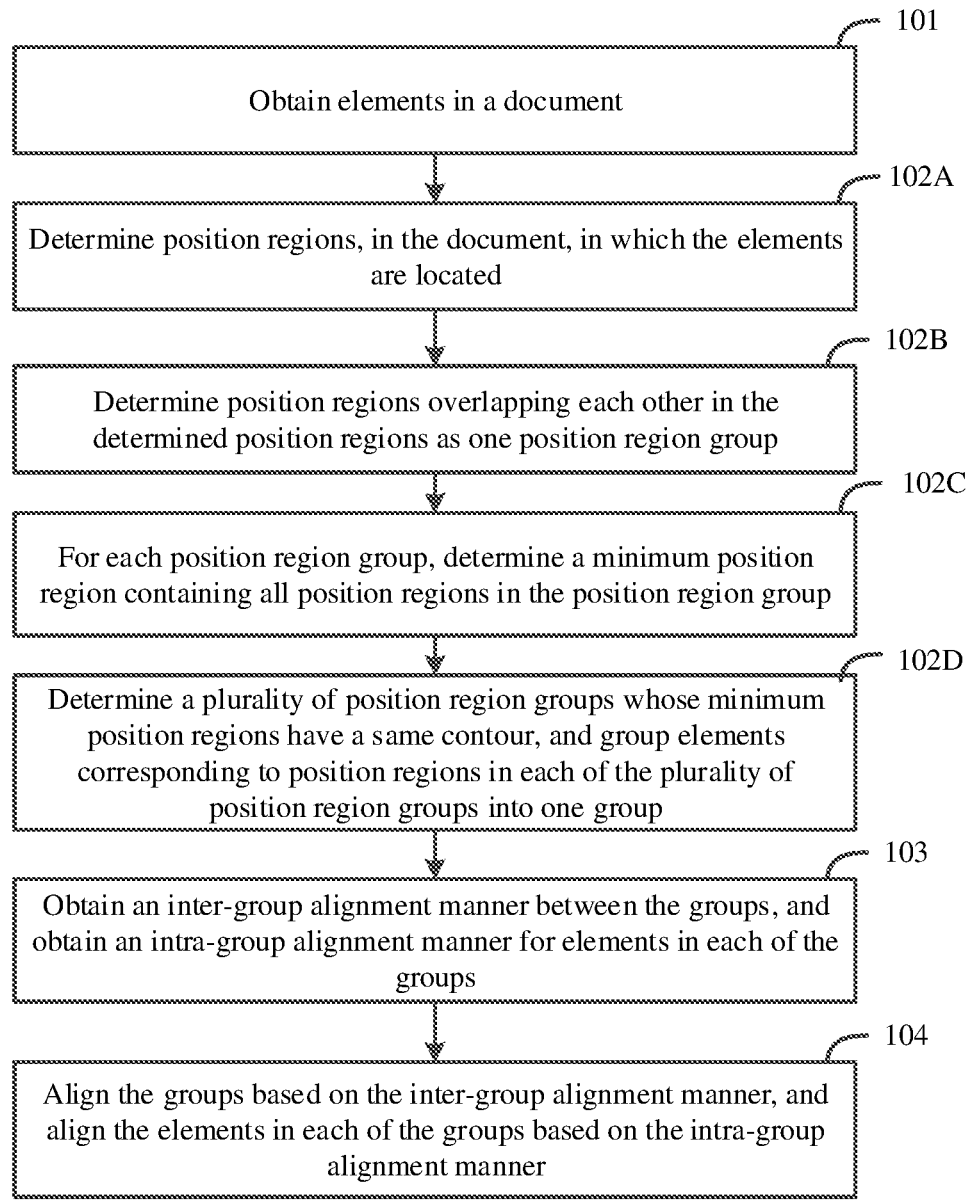
FIG. 2 is a flowchart of a second method for aligning elements in a document according to an embodiment of the present application.

Referring to FIG. 2, FIG. 2 provides a flowchart of a second method for aligning elements in a document. Compared with the embodiment illustrated in FIG. 1, in this embodiment, assigning the elements into groups in the step 102 further includes steps 102A to 102D.

At step 102A, position regions in which the elements are located in the document are determined.

For each element, the position region is a region surrounded by a contour of the element in the document. For example, for a text box containing a text, the position region of the element is a region occupied by the text box. For a figure, the position region of the element is a region surrounded by a contour of the figure in the document.

At step 102B, position regions which overlap each other in the determined position regions are determined as one position region group.

Figure 3:
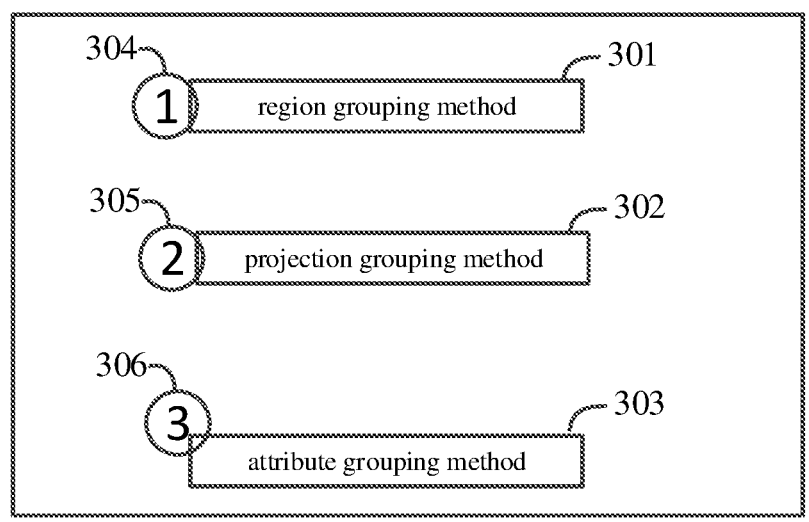
FIG. 3 is a diagram of a first document page according to an embodiment of the present application.

For example, as shown in FIG. 3, FIG. 3 illustrates a page in a document. Elements 301, 302 and 303 represent text boxes, and elements 304, 305 and 306 represent figures. Because position regions of the element 301 and the element 304 overlap in the document, the position regions in which the element 301 and the element 304 are respectively located are taken as one position region group. Similarly, position regions in which the element 302 and the element 305 are respectively located are taken as one position region group, and position regions in which the element 303 and the element 306 are respectively located are taken as one position region group.

At step 102C, for each position region group, a minimum position region containing all position regions in the position region group is determined.

In an embodiment of the present application, the electronic device may determine a minimum circumscribed rectangle region containing all position regions in the position region group as the minimum position region. The solution provided by the embodiment is convenient for data processing.

In another embodiment of the present application, the electronic device may, based on contours of all position regions in a position region group, obtain a minimum position region containing all the position regions. For example, in a case where the contours of all the position regions are a circle and a rectangle, the minimum position region is a region surrounded by a circle curves and rectangle line segments. In this way, the accuracy for assigning elements based on the contours of minimum position regions can be improved.

At step 102D, a plurality of position region groups whose minimum position regions have the same contour are determined, and elements corresponding to position regions in each of the plurality of position region groups are grouped into one group.

The same contour of the minimum position regions mean that shapes or sizes of the minimum position regions are the same.

Elements corresponding to position regions contained in the position region groups having a different contour of minimum position region are not grouped into one group.

For example, as shown in FIG. 3, because the contour of the minimum position region of the position region group corresponding to the element 301 and element 304 is the same as the contour of the minimum position region of the position region group corresponding to the element 302 and element 305, the element 301 and the element 304 are grouped into one group, and the element 302 and the element 305 are grouped into one group. However, the contour of the minimum position region of the position region group corresponding to the element 303 and element 306 is different from the contours of the other minimum position groups, thus the element 303 and the element 306 are not grouped into one group.

It can be seen that, in the solution provided by the embodiment, the electronic device may group the elements based on the position regions of the elements in the document.

In an embodiment of the present application, after the plurality of region groups whose minimum position regions have the same contour are determined, the method further includes:

determining, by the electronic device, whether a number of position regions in each of the plurality of position region groups is the same; in response to determining that the number of position regions in each of the plurality of position region groups is the same, performing the step of assigning elements corresponding to position regions in each of the plurality of position region groups into one group; and in response to determining that the plurality of position region groups each have a different number of position regions, assigning no elements corresponding to position regions in each of the plurality of position region groups into one group.

For example, as shown in FIG. 3, because a position region group for the element 301 and element 304 contains two elements, and a position region group for the element 302 and element 305 contains also two elements, i.e., the number of position regions in each of the position region groups is two, the element 301 and the element 304 are grouped into one group, and the element 302 and the element 305 are grouped into one group.

In the solution provided by the embodiment, the electronic device further determines the number of position regions in each of the position region groups after determining the contours of the minimum position regions, further improving the accuracy for assigning the elements.

Second Embodiment

Figure 4:
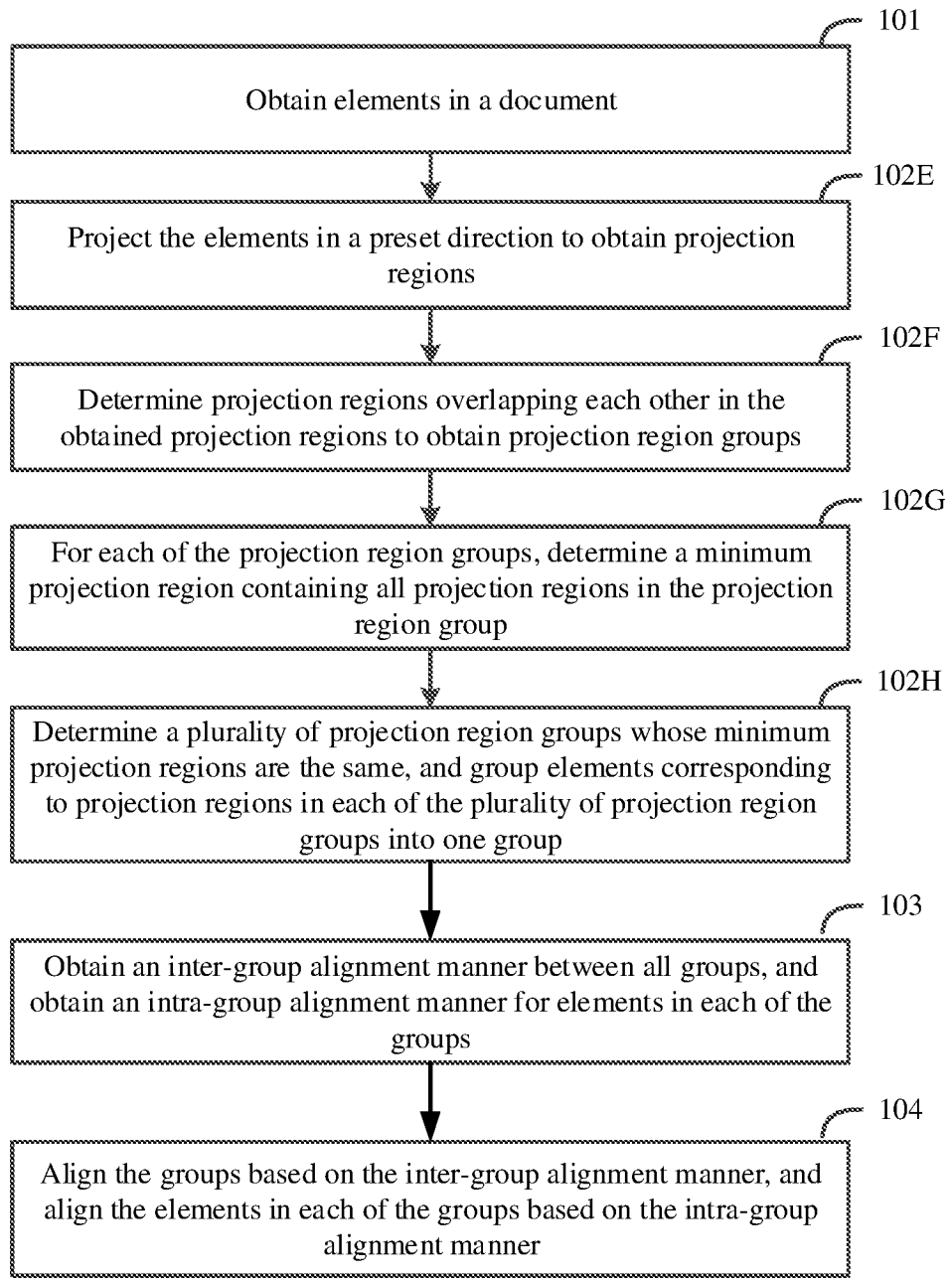
FIG. 4 is a flowchart of a third method for aligning elements in a document according to an embodiment of the present application.

Referring to FIG. 4, FIG. 4 provides a flowchart of a third method for aligning elements in a document. Compared with the embodiment shown in FIG. 1, in this embodiment, assigning the elements into groups in the step 102 further includes steps 102E to 102H.

At step 102E, the elements are projected in a preset direction to obtain projection regions.

The preset direction may be a vertical direction or a horizontal direction.

For example, the preset direction may be a vertically downward direction or a horizontally rightward direction, which is not limited in embodiments of the present application.

Figure 5A:
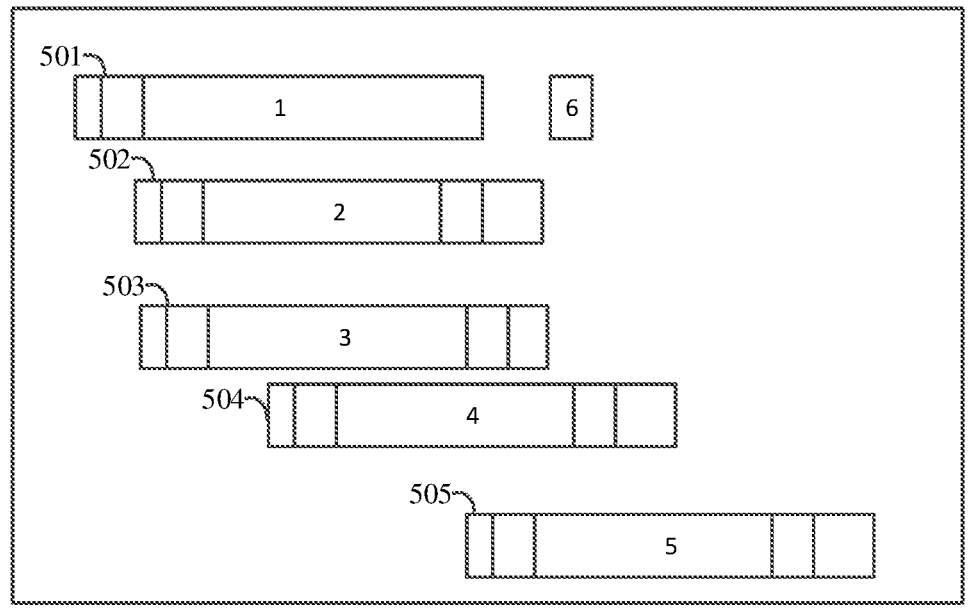
FIGS. 5a-5b are diagrams of a second document page according to an embodiment of the present application.
Figure 5B:
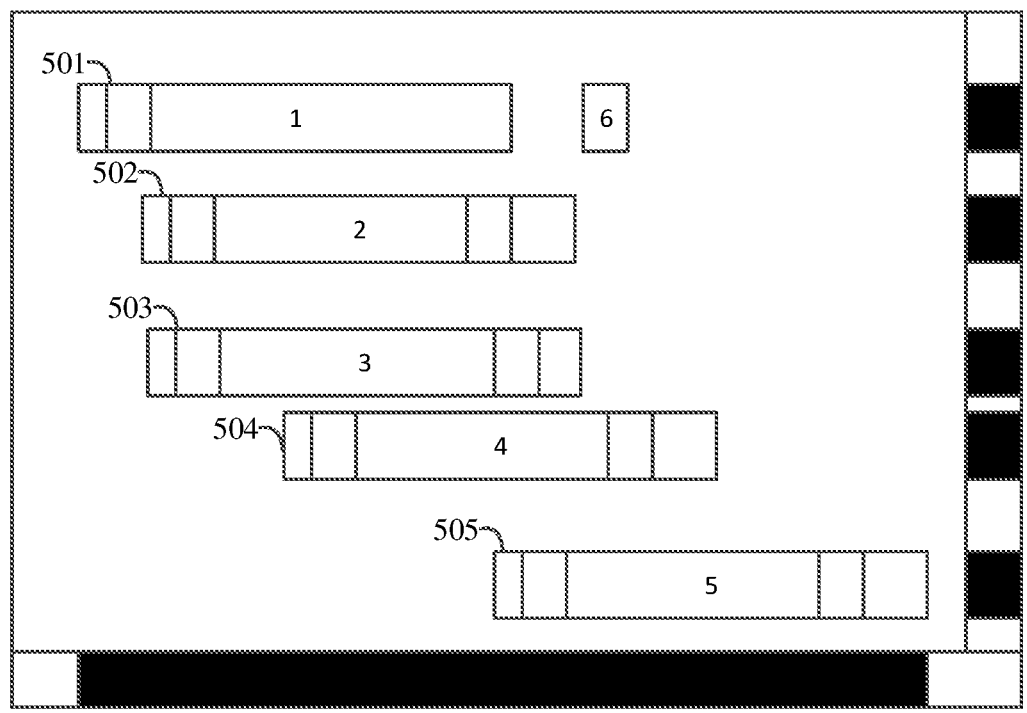

As shown in FIG. 5a, there are a plurality of elements in a document. The electronic device projects all elements in the horizontally rightward direction and the vertically downward direction respectively. Because regions obtained by means of projection are line segments, for the ease of observation and comparison, a width is preset for the projection. If all the elements are projected in the horizontally downward direction, projection regions shown at the right side of FIG. 5b are obtained. If all the elements are projected in the vertically downward direction, projection regions shown at the lower side of FIG. 5b are obtained.

At step 102F, projection regions which overlap each other in the obtained projection regions are determined to obtain projection region groups.

As shown in FIG. 5b, because projection regions of the element 1 and the element 6 in the horizontally rightward direction overlap, the element 1 and the element 6 belong to the same projection region group.

At step 102G, for each projection region group, a minimum projection region containing all projection regions in the projection region group is determined.

At step 102H, a plurality of projection region groups having a same minimum projection region are determined, and elements corresponding to projection regions in each of the plurality of projection region groups are grouped into one group.

The electronic device may determine whether the minimum projection regions are the same based on areas of the minimum projection regions. Alternatively, the electronic device may determine whether the minimum projection regions are the same based on lengths of sides in a direction perpendicular to the projection direction. For example, in a case where the projection direction is the horizontally rightward direction, it is determined whether the minimum projection regions are the same based on heights of the projection regions.

As shown in FIG. 5b, because the minimum projection regions of projection region groups corresponding to the elements 501, 502, 503, 504 and 505 are the same, each of the elements 501, 502, 503, 504, and 505 is one group.

It can be seen that, in the solution provided by the embodiment of the present application, the electronic device may group elements based on projections of the elements in the document. In this way, elements without overlapped regions in the document may also be grouped. By means of the solution provided by the embodiment, a coverage rate for the elements grouped in the document can be improved.

In an embodiment of the present application, after a plurality of projection region groups having the same minimum projection region are determined, the method further includes:

determining whether a number of projection regions in each of the plurality of projection region groups is the same; in response to determining that the number of projection regions in each of the plurality of projection region groups is the same, performing the step of assigning elements corresponding to projection regions in each of the plurality of projection region groups into one group; and in response to determining that the plurality of projection region groups each have a different number of projection regions, assigning no elements corresponding to projection regions in each of the plurality of projection region groups into one group.

In the solution provided by the embodiment, the electronic device may determine the number of projection regions in each of the projection region groups after the contours of the minimum projection regions are determined, which can improve the accuracy for assigning the elements.

Third Embodiment

Figure 6:
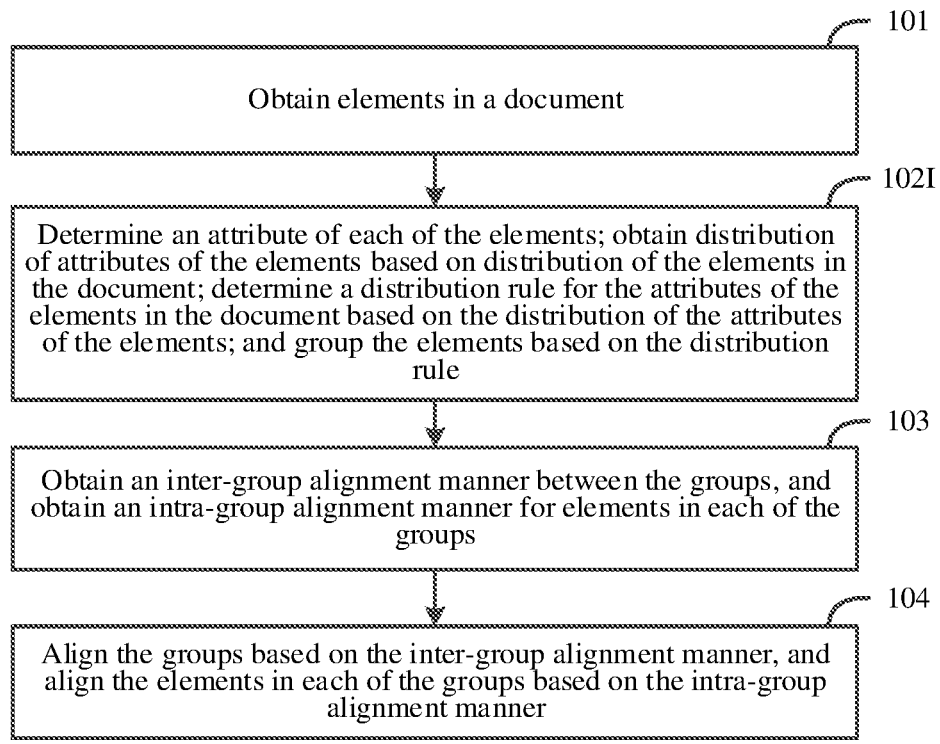
FIG. 6 is a flowchart of a fourth method for aligning elements in a document according to an embodiment of the present application.

Referring to FIG. 6, FIG. 6 provides a flowchart of a fourth method for aligning elements in a document. Compared with the embodiment shown in FIG. 1, in this embodiment, assigning the elements into groups in the step 102 further includes step 102I.

At step 102I, an attribute of each of the elements is determined; distribution of the attributes of the elements is obtained based on distribution of the elements in the document; a distribution rule for the attributes of the elements in the document is determined based on the distribution of the attributes of the elements; and the elements are grouped based on the distribution rule.

The attribute may be a type of an element. For example, the type includes a text, a figure, a picture, and the like. The attribute may also be a size, an angle, a font, and the like of an element. The distribution rule is a rule obtained by the electronic device from a preset distribution order of the elements. The preset distribution order may be from-left-to-right, from-top-to-bottom, or the like.

The distribution rule may be a rule found by the electronic device from preset distribution rules, or may be a distribution rule which is obtained by performing calculation on the distribution of the attributes of the elements in the document by the electronic device based on a rule algorithm. For example, the preset rule may be "figure, text", or may be "font 36, font 14, font 8", or may also be "blue, red, black", and the like. The distribution of the attributes of all the elements is matched with the preset rule to obtain the distribution rule for the attributes of the elements.

Figure 7:
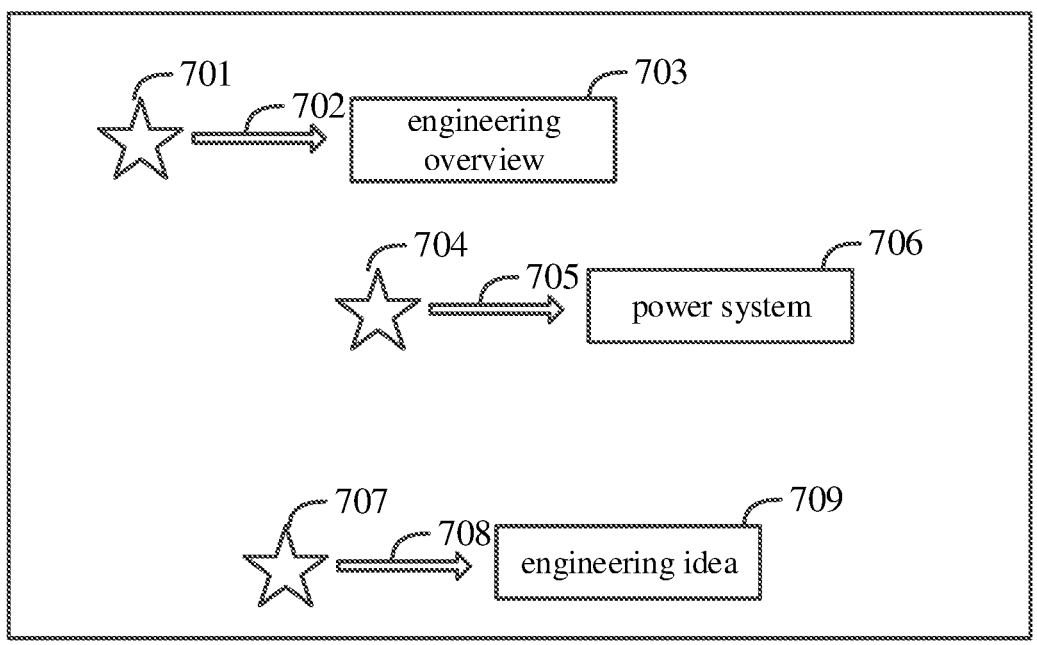
FIG. 7 is a diagram of a third document page according to an embodiment of the present application.

For example, referring to FIG. 7, the elements 701-709 respectively represent elements in a page. The elements in the page are traversed in order from-left-to-right, from-top-to-bottom, and attributes of all the elements are obtained sequentially:

a star, an arrow, a text, a star, an arrow, a text, a star, an arrow, a text.

From this, the distribution rule of the elements is "star, arrow, text". Based on the rule, the elements are grouped. Because the elements 701, 702 and 703 conform to the distribution rule, the elements 704, 705 and 706 conform to the distribution rule, and the elements 707, 708 and 709 conform to the distribution rule, the elements 701, 702 and 703 may be grouped into one group, the elements 704, 705 and 706 may be grouped into one group, and the elements 707, 708 and 709 may be grouped into one group.

It can be seen that, in the solution provided by the embodiment, the electronic device may group elements based on attributes of the elements in the document. In this way, elements which do not overlap other elements in their positions in the document still may be grouped. By means of the solution provided by the embodiment, the coverage rate for the elements grouped in the document can be improved.

For solutions provided by the first embodiment, the second embodiment or the third embodiment, in an implemented process of assigning elements, any of the solutions may be selected, or several solutions may be selected to be performed sequentially. For example, the three solutions are selected to group elements in the document. The elements in the document are grouped first based on the solution provided by the first embodiment. If the elements in the document can be grouped, then the process ends. If the elements in the document cannot be grouped, the solution provided by the second embodiment is performed. If the elements in the document can be grouped, then the process ends. If the elements in the document cannot be grouped, then the solution provided by the third embodiment is performed. The order of performing the solutions provided by individual embodiments is not limited in the embodiments of the present application.

Corresponding to the method for aligning elements in a document, an embodiment of the present application further provides an apparatus for aligning elements in a document.

Figure 8:
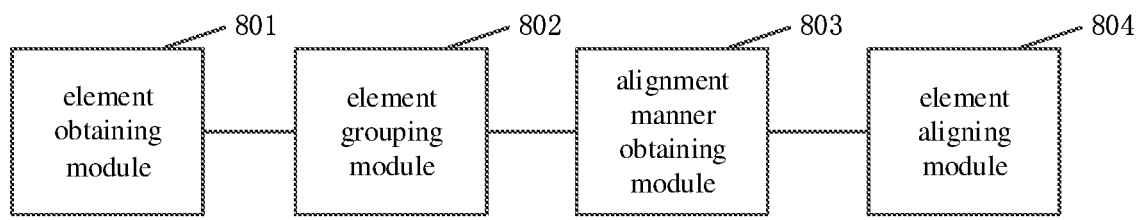
FIG. 8 is a structural diagram of an apparatus for aligning elements in a document according to an embodiment of the present application.

FIG. 8 is a structural diagram of an apparatus for aligning elements in a document according to an embodiment of the present application. The apparatus includes:

an element obtaining module 801 configured for obtaining elements contained in a document;

an element assigning module 802 configured for assigning the elements into groups;

an alignment manner obtaining module 803 configured for obtaining an inter-group alignment manner between the groups, and obtaining an intra-group alignment manner for elements in each of the groups; and an element aligning module 804 configured for aligning the groups based on the obtained inter-group alignment manner, and aligning the elements in each of the groups based on the obtained intra-group alignment manner.

In an embodiment of the present application, the element assigning module 802 includes:

a region determining unit configured for determining regions, in which the elements are located, in the document;

a region group determining unit configured for determining regions overlapping each other in the determined regions as one region group;

a minimum region determining unit configured for, for each region group, determining a minimum region containing all regions in the region group; and an element assigning unit configured for determining a plurality of region groups whose minimum regions are the same, and assigning elements corresponding to regions in each of the plurality of region groups into one group.

In an embodiment of the present application, the element assigning module 802 includes:

a position region determining unit configured for determining position regions, in which the elements are located, in the document;

a position region group determining unit configured for determining position regions overlapping each other in the determined position regions as one position region group;

a minimum position region determining unit configured for, for each position region group, determining a minimum position region containing all position regions in the position region group;

a position region group identifying unit configured for determining a plurality of position region groups whose minimum position regions have a same contour; and a first element assigning unit configured for assigning elements corresponding to position regions in each of the plurality of position region groups into one group.

In an embodiment of the present application, the element assigning module 802 further includes:

a position region number determining unit configured for, after the position region group identifying unit determines the plurality of position region groups whose minimum position regions have the same contour, determining whether a number of position regions in each of the plurality of position region groups is the same; and in response to determining that the number of position regions in each of the plurality of position region groups is the same, triggering the first element assigning unit.

In an embodiment of the present application, the element assigning module 802 includes:

an element projection unit configured for projecting the elements in a preset direction to obtain projection regions;

a projection region group obtaining unit configured for determining projection regions overlapping each other in the obtained projection regions to obtain projection region groups;

a minimum projection region determining unit configured for, for each projection region group, determining a minimum projection region containing all projection regions in the projection region group;

a projection region group identifying unit configured for determining a plurality of projection region groups whose minimum projection regions are the same; and a second element assigning unit configured for assigning elements corresponding to projection regions in each of the plurality of projection region groups into one group.

In an embodiment of the present application, the element assigning module 802 further includes:

a projection region number determining unit configured for, after the projection region group identifying unit determines the plurality of projection region groups whose minimum projection regions are the same, determining whether a number of projection regions in each of the plurality of projection region groups is the same, and if the number of projection regions in each of the plurality of projection region groups is the same, triggering the second element assigning unit.

In an embodiment of the present application, the element assigning module 802 is further configured for:

determining an attribute of each of the elements;
obtaining distribution of the attributes of the elements based on distribution of the elements in the document, and determining a distribution rule for the attributes of the elements in the document based on the distribution of the attributes of the elements; and
assigning the elements into groups based on the distribution rule.

It can be seen, in the solution for aligning elements in a document provided by the embodiment, elements contained in a document are first obtained; the elements are grouped; an inter-group alignment manner between all groups is obtained, and an intra-group alignment manner for elements in each of the groups is obtained; the groups are aligned based on the inter-group alignment manner, and the elements in each of the groups are aligned based on the intra-group alignment manner. Compared with the prior art, the solution for aligning the elements in a document provided by the embodiment of the present application groups the elements based on relationships between elements in the document and achieves a batch alignment of the elements in the document based on the existing intra-group alignment manner and inter-group alignment manner, without repeating, by the user, a manual alignment operation several times to align the elements in the document. By means of the solution of aligning elements in a document provided by the embodiment, the efficiency for aligning the elements in a document can be improved.

Corresponding to the method for aligning elements in a document, an embodiment of the present application further provides an electronic device.

Figure 9:
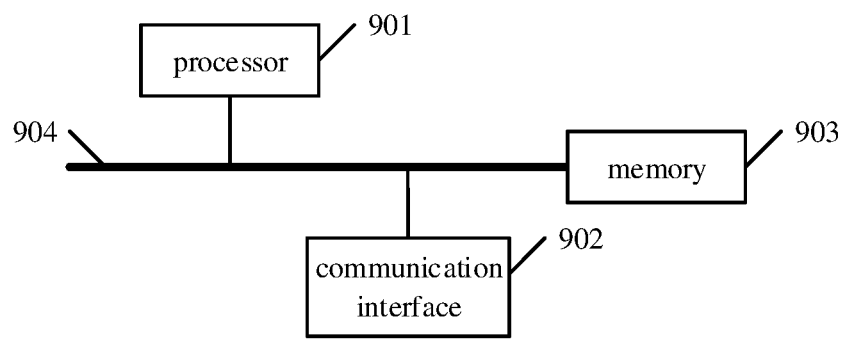
FIG. 9 is a structural diagram of an electronic device according to an embodiment of the present application.

In an embodiment of the present application, as shown in FIG. 9, a structural diagram of an electronic device is provided. The electronic device includes: a processor 901, a communication interface 902, a memory 903 and a communication bus 904. The processor 901, the communication interface 902 and the memory 903 communicate with each other through the communication bus 904.

The memory 903 is configured for storing a computer program.

The processor 901 is configured for executing the computer program stored in the memory 903 to implement the method for aligning elements in a document provided by the embodiment of the present application.

The communication bus of the electronic device may be a Peripheral Component Interconnect (PCI) bus or an Extended Industry Standard Architecture (EISA) bus or the like. The communication bus may include an address bus, a data bus, a control bus and the like. For ease of representation, only one thick line is used to represent the communication bus in the figure, which does not mean that there is only one bus or one type of bus.

The communication interface is configured for communication between the electronic device and other devices.

The memory may include a Random-Access Memory (RAM), or may also include a Non-Volatile Memory (NVM), such as at least one disk memory. Optionally, the memory may also be at least one storage apparatus located away from the processor.

The processor may be a general-purpose processor, including a Central Processing Unit (CPU), a Network Processor (NP) and the like. The processor may also be a Digital Signal Processing (DSP), an Application Specific Integrated Circuit (ASIC), a Field-Programmable Gate Array (FPGA) or other programmable logic devices, discrete gates or transistor logic devices, discrete hardware components.

In another embodiment of the present application, a computer-readable storage medium having stored therein a computer program is further provided. The computer program, when executed by a processor, causes the processor to implement any method for aligning elements in a document.

In another embodiment of the present application, a computer program product containing instructions is further provided. The computer program product, when executed by a processor, causes the computer to perform any method for aligning elements in a document in the embodiments.

It can be seen, in the solution for aligning elements in a document provided by the embodiment, elements contained in a document are first obtained; the elements are grouped; an inter-group alignment manner between all groups is obtained, and an intra-group alignment manner for elements in each of the groups is obtained; the groups are aligned based on the inter-group alignment manner, and elements in each of the groups are aligned based on the intra-group alignment manner.

The electronic device, the computer-readable storage medium and the computer program product provided by the embodiments of the present application can quickly and accurately implement the method for aligning elements in a document provided by the embodiment of the present application. Compared with the prior art, the solution for aligning the elements in a document provided by the embodiment of the present application groups the elements based on relationships between elements in the document and achieves a batch alignment of the elements in the document based on the existing intra-group alignment manner and inter-group alignment manner, without repeating, by the user, a manual alignment operation several times to align the elements in the document. By means of the solution of aligning elements in a document provided by the embodiment, the efficiency for aligning the elements in a document can be improved.

The embodiment may be implemented in whole or in part by software, hardware, firmware or any combination thereof. When implemented by the software, the embodiment may be implemented in the form of a computer program product in whole or in part. The computer program product includes one or more computer instructions. When the computer program instructions are loaded and executed on a computer, the processes or functions described in the embodiments of the present application are generated in whole or in part. The computer may be a general-purpose computer, a special-purpose computer, a computer network, or other programmable apparatuses. The computer instructions may be stored in a computer-readable storage medium or transmitted from a computer-readable storage medium to another computer-readable storage medium. For example, the computer instructions may be transmitted from a website, computer, server, or data center to another website, computer, server or data center via a wired (such as a coaxial cable, an optical fiber, a digital subscriber line (DSL)) or wireless (such as infrared, wireless, microwave, etc.) manner. The computer-readable storage medium may be any available medium that can be accessed by a computer or may be a data storage device such as a server or data center integrated with one or more available mediums. The available medium may be a magnetic medium (for example, a floppy disk, a hard disk, a magnetic tape), an optical medium (for example, a DVD), or a semiconductor medium (for example, a solid state disk (SSD)), or the like.

It should be noted that the relationship terms used here, such as "first", "second", and the like are only used to distinguish one entity or operation from another entity or operation, but do not necessarily require or imply that there is any actual relationship or order between these entities or operations. Moreover, the terms "include", "comprise", or any variants thereof are intended to cover a non-exclusive inclusion, such that processes, methods, articles or devices, including a series of elements, include not only those elements that have been listed, but also other elements that have not specifically been listed or the elements intrinsic to these processes, methods, articles or devices. Without further limitations, elements limited by the wording "comprise(s) a/an . . . " and "include(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, electronic device, computer-readable storage medium and computer program product are described briefly, since they are substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for aligning elements in a document, the method comprising:
   obtaining elements contained in the document;
   assigning the elements into groups;
   obtaining an inter-group alignment manner between the groups, and obtaining a respective intra-group alignment manner for elements in each of the groups; and
   aligning the groups based on the inter-group alignment manner, and aligning the elements in each of the groups based on the corresponding intra-group alignment manner,
   wherein, assigning the elements into groups comprises:
   determining position regions, in which the elements are located, in the document; and
   determining position regions overlapping in the determined position regions as one position region group,
   wherein when a number of position regions in each of a plurality of position region groups is the same, the elements corresponding to the position regions in each of the plurality of position region groups are assigned into one group; when a number of position regions in a position region group is different from that in other position region groups of the plurality of position region groups, the elements corresponding to the position regions in the position region group are not assigned into one group,
   wherein assigning the elements into groups further comprises:
   determining an attribute of each of the elements;
   obtaining distribution of the attributes of the elements based on distribution of the elements in the document, and determining a distribution rule for the attributes of the elements in the document based on the distribution of the attributes of the elements; and
   assigning the elements based on the distribution rule,
   wherein the distribution rule is obtained by performing calculation on the distribution of the attributes of the elements in the document based on a rule algorithm.

2. The method of claim 1, wherein, after determining position regions overlapping in the determined position regions as one position region group, the method further comprises:
   for each position region group, determining a minimum position region containing all position regions in the position region group; and
   determining a plurality of position region groups whose minimum position regions have a same contour; and assigning elements corresponding to position regions in each of the plurality of position region groups into one group.

3. The method of claim 1, wherein, assigning the elements into groups further comprises:
   projecting the elements in a preset direction to obtain projection regions;
   determining projection regions overlapping in the obtained projection regions to obtain a projection region group;
   for each projection region group, determining a minimum projection region containing all projection regions in the projection region group; and
   determining a plurality of projection region groups whose minimum projection regions are the same, and assigning elements corresponding to projection regions in each of the plurality of projection region groups into one group.

4. The method of claim 3, wherein, after determining the plurality of projection region groups whose minimum projection regions are the same, the method further comprises:
   determining whether a number of projection regions in each of the plurality of projection region groups is the same; and
   in response to determining that the number of projection regions in each of the plurality of projection region groups is the same, assigning the elements corresponding to the projection regions in each of the plurality of projection region groups into one group.

5. The method of claim 1, wherein the distribution rule is a rule obtained from a preset distribution order of the elements.

6. The method of claim 1, wherein an attribute of an element comprises a type, a size, an angle, or a font of the element.

7. The method of claim 1, wherein the distribution rule is a rule obtained from preset distribution rules.

8. A method for aligning elements in a document, the method comprising:
   obtaining elements contained in the document;

assigning the elements into groups;

obtaining an inter-group alignment manner between the groups, and obtaining a respective intra-group alignment manner for elements in each of the groups; and aligning the groups based on the inter-group alignment manner, and aligning the elements in each of the groups based on the corresponding intra-group alignment manner, wherein, assigning the elements into groups comprises:

determining an attribute of each of the elements;

obtaining distribution of the attributes of the elements based on distribution of the elements in the document, and determining a distribution rule for the attributes of the elements in the document based on the distribution of the attributes of the elements; and assigning the elements based on the distribution rule, wherein a same group of the groups comprises multiple types of elements, and different groups of the groups have a same number of types of the elements and a same order of the elements, wherein the distribution rule is obtained by performing calculation on the distribution of the attributes of the elements in the document based on a rule algorithm, wherein assigning the elements into groups further comprises:

determining position regions, in which the elements are located, in the document;

determining position regions overlapping in the determined position regions as one position region group;

for each position region group, determining a minimum position region containing all position regions in the position region group; and determining a plurality of position region groups whose minimum position regions have a same contour; and assigning elements corresponding to position regions in each of the plurality of position region groups into one group.

9. The method of claim 8, wherein an attribute of an element comprises a type, a size, an angle, or a font of the element.

10. The method of claim 8, wherein, after determining the plurality of position region groups whose minimum position regions have the same contour, the method further comprises:

determining whether a number of position regions in each of the plurality of position region groups is the same; and in response to determining that the number of position regions in each of the plurality of position region groups is the same, assigning the elements corresponding to the position regions in each of the plurality of position region groups into one group.

11. The method of claim 8, wherein, assigning the elements into groups further comprises:

projecting the elements in a preset direction to obtain projection regions;

determining projection regions overlapping in the obtained projection regions to obtain a projection region group;

for each projection region group, determining a minimum projection region containing all projection regions in the projection region group; and determining a plurality of projection region groups whose minimum projection regions are the same, and assigning elements corresponding to projection regions in each of the plurality of projection region groups into one group.

12. The method of claim 11, wherein, after determining the plurality of projection region groups whose minimum projection regions are the same, the method further comprises:

determining whether a number of projection regions in each of the plurality of projection region groups is the same; and in response to determining that the number of projection regions in each of the plurality of projection region groups is the same, assigning the elements corresponding to the projection regions in each of the plurality of projection region groups into one group.

13. An electronic device, comprising: a processor, a communication interface, a memory, and a communication bus, wherein, the processor, the communication interface and the memory communicate with each other through the communication bus, the memory is configured for storing a computer program;

the processor is configured for executing the computer program stored in the memory to implement the method for aligning elements in a document of claim 1.

14. An electronic device, comprising: a processor, a communication interface, a memory, and a communication bus, wherein, the processor, the communication interface and the memory communicate with each other through the communication bus, the memory is configured for storing a computer program;

the processor is configured for executing the computer program stored in the memory to implement the method for aligning elements in a document of claim 8.

* * * * *